Sept. 12, 1967    R. W. COSTIN    3,341,251
SEAT ASSEMBLY
Filed April 11, 1966
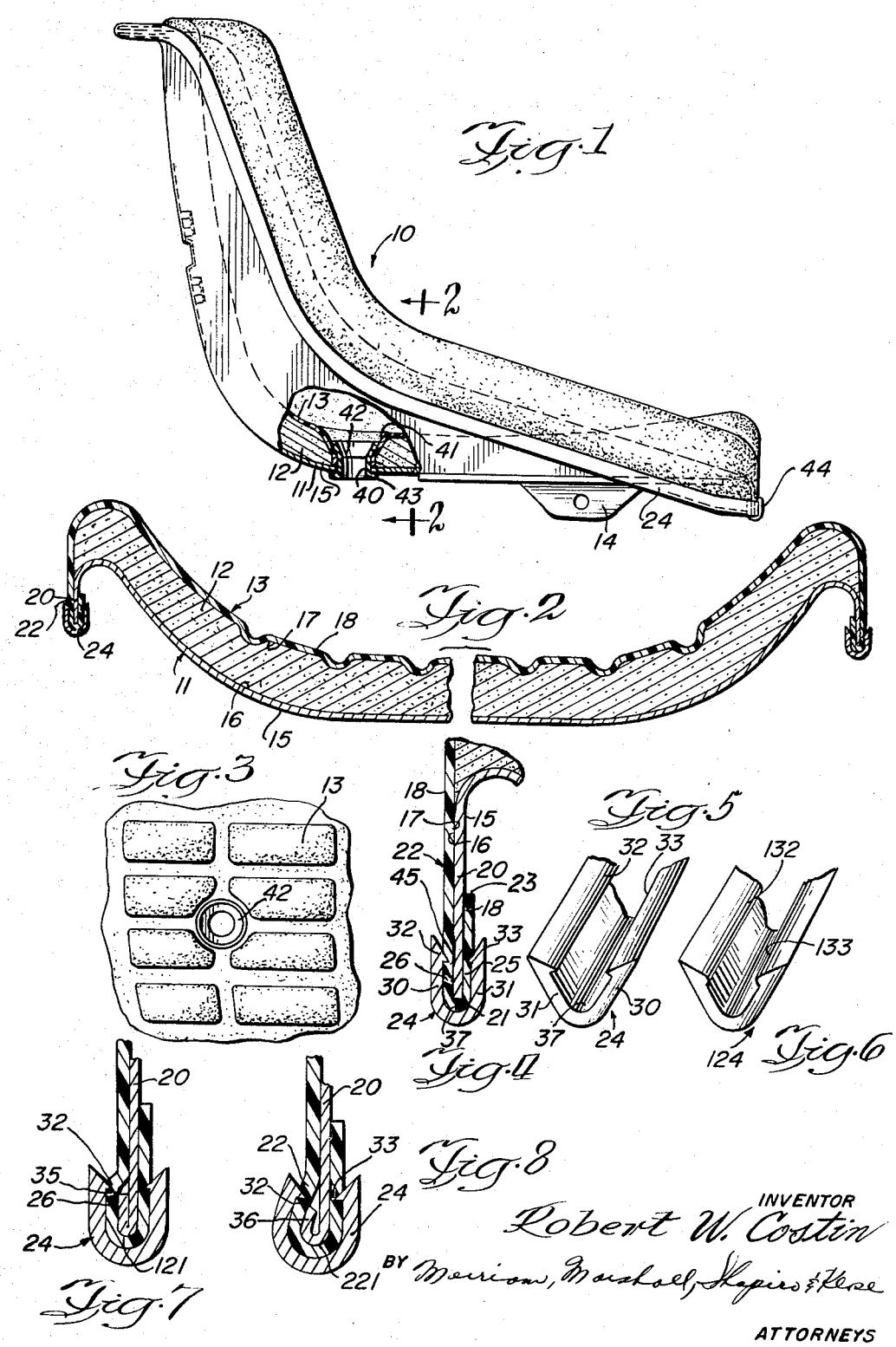
INVENTOR
Robert W. Costin
BY Merriam, Marshall, Shapiro & Klose
ATTORNEYS United States Patent Office 3,341,251
Patented Sept. 12, 1967

3,341,251
SEAT ASSEMBLY
Robert W. Costin, Palatine, Ill., assignor to Coach and Car Equipment Corporation, Chicago, Ill., a corporation of Illinois
Filed Apr. 11, 1966, Ser. No. 541,743
6 Claims. (Cl. 297—452)

The present invention relates generally to a seat assembly and more particularly to a seat assembly having a peripheral seat edge constructed to withstand deterioration upon exposure to weather and/or severe wear and abrasion.

The seat assembly of the present invention is intended for use on vehicles including off-the-road vehicles, such as farm tractors. Conventional seat assemblies intended for use on off-the-road vehicles generally include a contoured, rigid seat base or pan having a peripheral flange extending away from the occupant-accommodating part of the seat assembly. The seat base is typically covered by padding overlying a substantial portion of a surface of the seat base; and the padding is generally covered by a flexible fabric having a peripheral portion which is secured to the peripheral flange on the seat base to hold the padding in place on the seat base. The fabric cover also keeps moisture from the padding and interior parts of the seat assembly, thereby increasing the life of the padding.

Deterioration of the fabric is caused by abrasion or wear or exposure to weather. In the absence of some kind of protection, the part of the fabric where fabric deterioration is most likely to occur is the peripheral portion of the fabric because this is where the fabric is subjected to the most stresses, by virtue of its securement to the peripheral flange of the seat base.

Once the fabric deteriorates at its peripheral portion, subsequent deterioration of other parts of the fabric results; and this occurs much more rapidly than would be the case if wear or deterioration at the peripheral portion of the fabric did not occur. Once the fabric begins to deteriorate, the interior of the seat assembly, comprising the padding, would be exposed to moisture and wear; and the life of the seat assembly would be minimized.

In accordance with the present invention, means are provided for protecting the peripheral portion of the fabric and for thus increasing the life of the entire fabric and of the seat assembly.

Other features and advantages are inherent in the structure claimed and disclosed or will become apparent to those skilled in the art from the following detailed description in conjunction with the accompanying diagrammatic drawings wherein:

FIGURE 1 is a side elevational view, partially cut away and partially in section, illustrating an embodiment of a seat assembly in accordance with the present invention;

FIGURE 2 is a sectional view, taken along line 2—2 in FIGURE 1;

FIGURE 3 is a fragmentary plan view of a part of the seat assembly of FIGURE 1;

FIGURE 4 is an enlarged fragmentary sectional view of an embodiment of a peripheral edge construction for the seat assembly;

FIGURE 5 is a fragmentary perspective of a protective peripheral strip used in the seat assembly;

FIGURE 6 is a fragmentary perspective of another embodiment of a protective strip used in the seat assembly;

FIGURE 7 is an enlarged fragmentary sectional view illustrating another embodiment of an edge construction; and FIGURE 8 is an enlarged fragmentary sectional view of a further embodiment of an edge construction.

Referring initially to FIGURE 1, there is indicated generally at 10 an embodiment of a seat assembly constructed in accordance with the present invention and comprising a contoured rigid seat base 11, padding means 12 overlying a substantial portion of the inner surface of seat base 11, and flexible fabric means 13 covering the padding means. Attached to the bottom of seat base 11 is a bracket 14 for mounting seat assembly 10 on support structure (not shown) typically located over the rear axle of a farm tractor, for example.

Referring to FIGURES 2 and 4, rigid seat base 11 has a peripheral flange 20 terminating at an end 21; and flexible fabric means 13 has a peripheral portion 22 extending around end 21 of flange 20 and terminating at a peripheral edge 23. Peripheral portion 22 on the flexible fabric means is secured to peripheral flange 20 on the rigid seat base by a deformable channel-shaped strip 24 disposed along the entire periphery of seat assembly 10.

Seat base 11 has a pair of opposed surfaces, an outer surface 15 and an inner surface 16; and flexible fabric means 12 has a pair of opposed surfaces, an inner surface 17 and an outer surface 18.

Peripheral portion 22 on the flexible fabric means has a first part 25 and a second part 26, the second part 26 being located inwardly of first part 25, as measured from edge 23 of peripheral fabric portion 22. First part 25 is disposed alongside outer surface 15 of peripheral flange 20 on the rigid seat base, and second part 26 is disposed alongside inner surface 16 of peripheral flange 20. In addition, inner fabric surface 17 on first part 25 is in face-to-face contact with outer surface 15 of rigid seat base 11, adjacent end 21 of peripheral flange 20; and inner fabric surface 17 on second part 26 is in face-to-face contact with the inner surface 16 of rigid seat base 11, adjacent end 21 of peripheral flange 20.

Channel-shaped peripheral strip 24 has a pair of opposed wings 30, 31 each extending around end 21 of peripheral flange 20 and protectively covering outer surface 18 of peripheral fabric portion 22. In addition, each of wings 30, 31 has continuous protrusion means 32, 33, respectively, protruding from the inner side of the wing and pressing into a respective opposed part 26, 25 of peripheral fabric portion 22 to hold inner fabric surface 17 in contacting engagement with both surfaces 15, 16 of peripheral flange 20.

The structure described in the preceding paragraphs effectively secures together peripheral portion 22 of flexible fabric means 13 and peripheral flange 20 of rigid seat base 11 and protects peripheral fabric portion 22 from wear, abrasion and exposure. Strip 24 prevents rain or other moisture from entering between flexible fabric means 13 and rigid seat base 11 at that part of the seat assembly containing padding 12.

FIGURES 5 and 6 show the peripheral strip before assembly. The strip may have the form illustrated in FIGURE 5 wherein protrusion means 32, 33 are barbs. Alternatively, the strip may have the form shown at 124 in FIGURE 6 wherein the protrusions are unsharpened, as at 132, 133; or one wing of the strip may have a barb and the other wing may have an unsharpened protrusion.

When the seat assembly is put together, typically strip 24 is placed around the peripheral portion 22 of flexible fabric means 13 and crimped in place along the entire periphery of the seat assembly. To facilitate crimping or other deformation during construction of the seat assembly, strip 24 is composed of material, such as aluminum, which is more ductile than the rigid seat base which is composed of steel or a rigid plastic or rigid fiberglass material, for example. Other materials from which the peripheral strip may be composed include brass and copper.

Strip 24 is composed of a relatively ductile material such as aluminum, rather than a relatively hard material such as steel, because aluminum is much more easily crimped than steel and may be crimped without wrinkles, a feature not available if strip 24 were composed of steel. Wrinkles would be undersirable in strip 24 from an appearance standpoint and because they would not function to exclude moisture from contacting that part of peripheral portion 22 of the flexible fabric means which is enclosed by strip 24.

The strip may be an extrusion or a formed or rolled section. It may be in the form of a ring, without ends, or it may have a pair of opposed ends which are connected by a clip 44 (FIG. 1), or other conventional means, when the strip has been crimped into place.

Typical materials of which the flexible fabric means is composed include vinyl (either cast or sheet) or ABS (acrylonitrile butadiene styrene).

Padding 12 may be composed of urethane foam or any conventional cushion or padding material or resiliency-imparting structure.

The coefficient of friction between a flexible fabric, such as vinyl, and a metal, such as steel, is low; and a problem which arises after strip 24 is crimped into place is that the flexible fabric means may slip and stretch relative to the rigid seat base, at the peripheral flange thereof, during usage. This may cause the entire assembly consisting of strip 24 and the parts of peripheral fabric portion 22 enclosed within strip 24 to be pulled entirely off of peripheral flange portion 20. This problem of slippage or stretching is prevented, in the seat assembly constructed in accordance with the present invention, by means now to be described.

Referring to the embodiment of FIGURE 4, there is provided means, located at 45, contacting inner surface 17 on second part 26 of peripheral fabric portion 22, for reducing slippage of second part 26 relative to inner surface 16 of peripheral flange 20 of the rigid seat base. Alternatively, the slippage-reducing means may contact the inner surface of first part 25 to reduce slippage of fabric part 25 relative to outer surface 15 of peripheral flange 20. The location (e.g., 45) of the slippage-reducing means should be at least as close to end 21 of the peripheral flange at which the location the fabric part 26 or 25 is pressed by a barb 32 or 33 of strip 24.

The slippage-reducing means may be in the form of adhesive, or it may be in the form of a roughened surface part or protruding teeth on either surface of flange portion 20.

Referring to FIGURE 7, the slippage-reducing means may be in the form of a shoulder 35 formed by bending flange 20 back upon itself either outwardly (as in FIG. 7) or inwardly. This forms a slippage-reducing structure extending continuously along the flange. In the embodiment of FIGURE 7, numeral 121 indicates that part of peripheral flange 20 which corresponds to flange end 21 in the embodiment of FIGURE 4.

In the embodiment of FIGURE 8, flange portion 20 terminates at a hook portion 36 which cooperates with barb 32 on strip 24 to lock the first part 25 of peripheral portion 22 of the flexible fabric means and to prevent stretching or slippage thereof when strip 24 is crimped into place. In the embodiment of FIGURE 8, the numeral 221 indicates that part of flange portion 20 which corresponds to end 21 in the embodiment of FIGURE 4.

In another embodiment, adhesive is provided between fabric outer surface 18 and the inner surface of strip 24 at a location 37 (FIG. 4) between the wings of the strip. This assists in securing together strip 24 and peripheral portion 22 of the flexible fabric means.

Another feature of the seat assembly is the provision of ventilating openings or shafts extending through the padding together with the provision of means for protecting the padding from exposure at the shafts.

Referring to FIGURES 1 and 3, rigid seat base 11 has an opening 40 therein, and communicating with opening 40 is an open shaft 41 extending through padding 12. Flexible fabric means 13 extends into open shaft 41 and covers substantially the entire surface area of the walls of the shaft to protect the padding from exposure at the shaft. Also located at the shaft is a tubular member 42 having a pair of open opposite ends and received within open shaft 41 inside the flexible fabric means. Tubular member 42, which may be in the form of a flexible rubber member, has a peripheral flange 43 extending outwardly around the bottom open end of tubular member 42. The tubular member extends into the shaft from opening 40 and is disposed alongside of and in contacting engagement with the flexible fabric means covering the walls of the shaft. Flange 43 is in lapping contact with surface 15 of the rigid seat base around opening 40. Grommet 42, with flange 43, effectively prevents moisture from entering between seat base 11 and flexible fabric means 13 at open shaft 41.

The foregoing detailed description has been given for clearness of understanding only, and no unnecessary limitations should be understood therefrom, as modifications will be obvious to those skilled in the art.

What is claimed is:

1. A seat assembly comprising:
    a rigid seat base having a pair of opposed surfaces;
    padding means overlying a substantial portion of one surface of said seat base;
    flexible fabric means having a pair of opposed fabric surfaces with one of said surfaces covering said padding;
    said rigid seat base having a peripheral flange terminating at an end;
    said flexible fabric means having a peripheral portion extending alongside said peripheral flange of the seat base and terminating at a peripheral edge;
    and a deformable channel-shaped strip, having a pair of opposed wings, and extending around the end of the peripheral flange on the seat base, and protectively covering the other of said fabric surfaces at the peripheral portion of the flexible fabric means;
    said deformable strip being disposed along the entire periphery of the seat assembly and being self-secured to said flange portion;
    one of said wings on the deformable strip having protrusion means protruding from the inner side of said wing, pressing into the peripheral portion on the flexible fabric means, and holding the one fabric surface in contacting engagement with an adjacent surface of the peripheral flange of the seat base;
    said protrusion means extending continuously for the length of said strip and including means cooperating with said flexible fabric means to provide a continuous, uninterrupted seal along the entire periphery of the seat assembly.

2. A seat assembly as recited in claim 1 wherein:
    said deformable strip is composed of material which is more ductile than the material of which the rigid seat base is composed.

3. A seat assembly as recited in claim 1 and comprising:
    shoulder means, extending continuously along the peripheral flange, engaging said one surface on the peripheral portion of the flexible fabric means, for reducing slippage of said one surface on the peripheral portion relative to the adjacent surface of the peripheral flange;
    said continuous shoulder means being at least as close to the end of the peripheral flange as the location at which said fabric peripheral portion is pressed by said continuous protrusion means.

4. A seat assembly as recited in claim 1 and comprising:
    adhesive between the other of said fabric surfaces and the inner surface of said deformable strip at a location between the wings of the strip.

5. A seat assembly as recited in claim 1 and comprising:
an opening in said seat base;
and an open shaft extending through said padding means and communicating with said opening in the seat base;
said flexible fabric means extending into said open shaft and covering substantially the entire surface area of the walls of said shaft to protect the padding from exposure at said shaft;
a tubular member, having a pair of open opposite ends, received within said open shaft inside of said flexible fabric means;
said tubular member extending into said shaft alongside of and in contacting engagement with the flexible fabric means covering the walls of the shaft;
said tubular member having a peripheral flange at one open end extending over said other surface of the rigid seat base and in lapping disposition therewith.

6. In a seat assembly:
a rigid seat base having a pair of opposed surfaces;
padding means overlying a substantial portion of one surface of said seat base;
flexible fabric means having a pair of opposed fabric surfaces with one of said surfaces covering said padding;
an opening in said seat base;
and an open shaft extending through said padding means and communicating with said opening in the seat base;
said flexible fabric means extending into said open shaft and covering substantially the entire surface area of the walls of said shaft to protect the padding from exposure at said shaft;
a tubular member, having a pair of open opposite ends, received within said open shaft inside of said flexible fabric means;
said tubular member extending into said shaft alongside of and in contacting engagement with the flexible fabric means covering the walls of the shaft;
said tubular member having a peripheral flange at one open end extending over said other surface of the rigid seat base and in lapping disposition therewith.

References Cited

UNITED STATES PATENTS

| | | | |
|---|---|---|---|
| 2,347,538 | 4/1944 | Bloomberg | 5—353.5 X |
| 2,639,764 | 5/1953 | Fernberg | 5—353.7 |
| 2,649,898 | 8/1953 | Quackenbush | 5—353.3 |
| 2,836,227 | 5/1958 | Swenson | 297—457 |
| 3,026,145 | 3/1962 | Galbraith | 297—455 |

CASMIR A. NUNBERG, *Primary Examiner.*